Jan. 3, 1939.   K. A. AHLGREN   2,142,878
ANCHOR BOLT FOR BOAT MOTORS
Filed Oct. 28, 1937

Inventor
Karl A. Ahlgren
By Bryant & Lowry
Attorney

Patented Jan. 3, 1939

2,142,878

UNITED STATES PATENT OFFICE 2,142,878

ANCHOR BOLT FOR BOAT MOTORS

Karl A. Ahlgren, Philadelphia, Pa.

Application October 28, 1937, Serial No. 171,553

1 Claim. (Cl. 151—31)

This invention relates to certain new and useful improvements in anchor bolt for boat motors.

Various forms of driftbolts and lagbolts have heretofore been employed for anchoring a motor in a wooden boat or vessel and such bolts have in general been of a complex structure and expensive manufacture without giving entirely satisfactory results as the vibration of the motor and boat during travel resulted in the loosening of the motor anchorage. It is therefore the primary object of this invention to provide a drift bolt for anchoring a motor in the hull of a wooden boat or vessel, the bolt having a removable head engageable with the bottom or hull of the boat with a threaded end of the bolt threading into a socket in the bolt head and constructed in a manner to effect a locking engagement between the bolt shank and head when the bolt shank is screwed home.

A further object of the invention is to provide a driftbolt for use in anchoring a motor in a wooden boat or vessel wherein the shank of the bolt has a split threaded end with a wedge key therein to cause the legs of the split end to spread apart when the bolt shank is screwed into a bolt head for anchoring the shank to the head.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1:
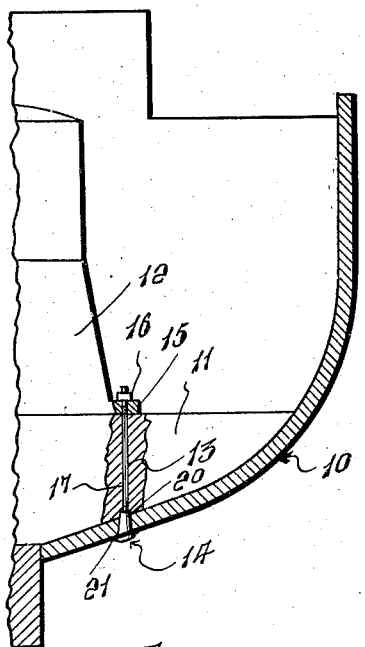
Figure 1 is a fragmentary sectional view of the boat having a motor anchored therein by the improved driftbolt of this invention.

Referring more in detail to the accompanying drawing and particularly to Figures 1 to 4, the reference character 10 designates the hull of a ship having a block 11 therein for the mounting of the motor 12. The motor is anchored in position on the block 11 by means of a driftbolt designated in general by the reference character 13 and having a head 14 at one end engaged with the hull 10 of the boat, the driftbolt passing through the block 11 and a flange 15 at the base of the motor 12 for the reception of an anchor nut 16.

Figure 2:
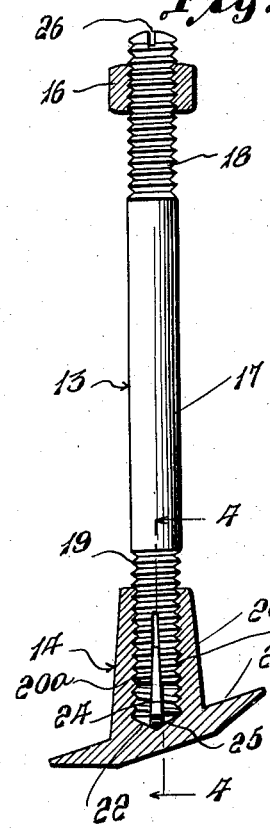
Figure 2 is a side elevational view of the driftbolt with the head and retaining nut shown in section with the shank of the bolt partly threaded into the head and illustrating the wedge key in the split end of the shank to effect the locking engagement between the shank and head when the shank is screwed home.
Figure 3:
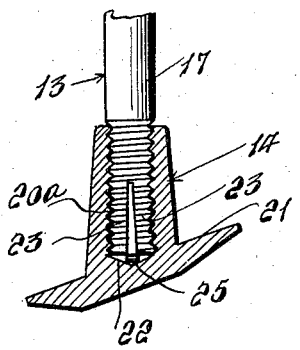
Figure 3 is a sectional view of the bolt head showing the shank of the bolt screwed home and with the legs of the split end spread apart by a wedge member into engagement with the walls of the socket of the head.
Figure 4:
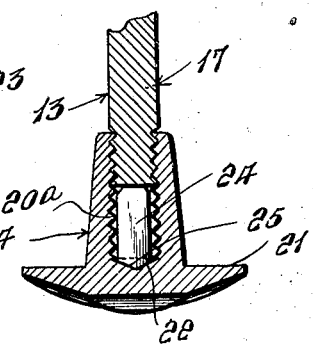
Figure 4 is a detail sectional view taken on line 4—4 of Figure 2, the bolt head shown in Figures 1 to 4 including a flange engageable with the outer face of the hull of the boat.

The head 14 of the driftbolt 13 together with the shank of the driftbolt are shown in detail in Figures 2 to 4, the shank being designated by the reference character 17 and threaded at opposite ends thereof as at 18 and 19, the threaded end 18 receiving the nut 16.

The head 14 of the driftbolt 13 comprises an internally threaded socket 20 and a head flange 21 disposed at an angle to the longitudinal axis of the socket 20 to accommodate the head 14 to the angularity or curvature of the bottom of the hull 10 of the boat. A conical recess 22 is formed in the bottom of the internally threaded socket 20 of the head 14 for purposes presently to appear.

A locking connection is established between the threaded end 19 of the shank 17 and the head 14 of the drift bolt when the shank is screwed home in the socket 20 and to accomplish such locking connection, the threaded end 19 of the shank 17 is longitudinally split to provide side legs 23 between which a wedge key 24 is inserted to normally project below the legs 23 as shown in Figure 2, the lower end of the wedge key 24 being of V-shape as at 25 for reception in the conical recess 22 at the lower end of the socket 20. The shank 17 of the driftbolt is threaded into the socket 20 by means of a screw driver or the like engaged with the kerf 26 at the outer end of the threaded portion 18 of the shank 17, the shank 17 when moving from the position shown in Figure 2 to that shown in Figures 3 and 4 causing the side legs 23 of the split threaded end 19 to be separated and moved into binding engagement with the threaded wall of the socket 20 as indicated by the heavy thread lines 20a in Figures 3 and 4, the wedge key 24 moving upwardly between the legs 23 when the shank 17 is screwed home in the socket 20. As shown in Figure 1, the flange 21 on the driftbolt head 14 is engaged with the outer face of the hull 10 of the boat, the socket 20 of the head extending through an opening in the hull while the shank 17 of the driftbolt 13 freely passes through the motor mounting block 11.

Figure 5:
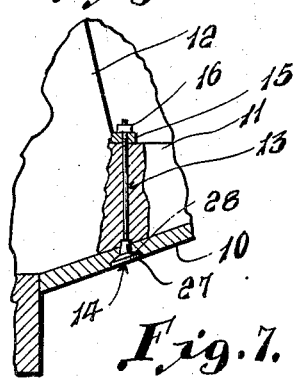
Figure 5 is a detail sectional view, similar to Figure 1, showing the head of the bolt designed for flush engagement with the outer face of the hull.
Figure 6:
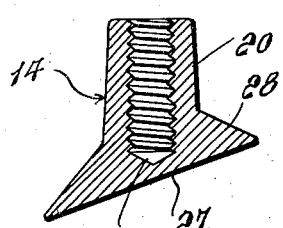
Figure 6 is a sectional view of the bolt head as shown in Figure 5.

In the form of invention illustrated in Figures 5 and 6, the flange carried by the socket 20 is disposed at an angle to the longitudinal axis of the socket, the bottom face 27 of the flange being flat while the upper face thereof is of tapering or conical formation as at 28 for seating in a recess formed in the lower face of the hull 10 of the boat with the flat face 27 of the flange flush with the outer face of the hull 10, the flange being countersunk in the hull.

Figure 8:
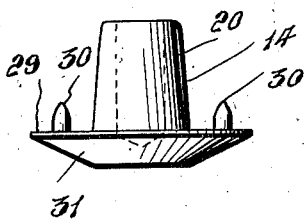
Figure 8 is a side elevational view of the bolt head shown in Figure 7.
Figure 7:
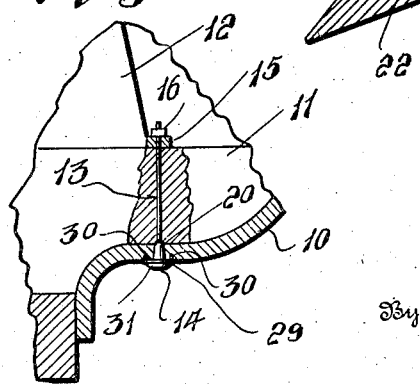
Figure 7 is a detail sectional view similar to Figures 1 and 5 of another form of bolt head that has locking engagement with the hull of the boat.

It is also intended to provide a locking connection between the head 14 of the driftbolt and the hull 10 of the boat and as shown in Figures 7 and 8, the socket 20 of the head 14 carries a head flange 29 having a flat face at the base of the socket 20 from which rises a series of anchor pins 30 while the outer face of the flange 29 is tapered or of conical formation as at 31. As shown in Figure 7, the flat face 29 is engaged with the outer face of the hull 10 of the ship, the pins 30 being driven into the hull 10 to hold the head 14 against rotation relative to the hull of the boat.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:

A driftbolt of the character described comprising a shank having a threaded end, the threaded end of the shank being bifurcated, an internally threaded socketed head into which the bifurcated end of the shank is threaded and a wedge key in the bifurcated end of the shank and normally projecting beyond the end of the shank for engagement with the bottom of the socket in the head and adapted to spread the bifurcated ends of the shank when the latter is threaded into the head for moving the bifurcated ends into frictional and binding engagement with the walls of the head socket, the bottom wall of the socket being of conical formation and the wedge key being of blade-like form with the normally projecting end of V-shape incident to the conical socket to facilitate rotation of the wedge key in the bottom of the socket and movement of the key in the bifurcated end of the shank during rotation of the shank in the socketed head.

KARL A. AHLGREN.